(12) United States Patent
O'Malley

(10) Patent No.: US 10,816,732 B2
(45) Date of Patent: *Oct. 27, 2020

(54) LOW DN/DT OPTICAL ADHESIVES

(71) Applicant: CORNING RESEARCH & DEVELOPMENT CORPORATION, Corning, NY (US)

(72) Inventor: Shawn Michael O'Malley, Horseheads, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,213

(22) Filed: Oct. 11, 2019

(65) Prior Publication Data

US 2020/0116946 A1    Apr. 16, 2020

Related U.S. Application Data

(60) Provisional application No. 62/745,573, filed on Oct. 15, 2018.

(51) Int. Cl.
*G02B 6/26* (2006.01)
*C09J 9/00* (2006.01)
(Continued)

(52) U.S. Cl.
CPC .......... *G02B 6/262* (2013.01); *C08F 220/22* (2013.01); *C08F 222/1006* (2013.01);
(Continued)

(58) Field of Classification Search
None
See application file for complete search history.

(56) References Cited

U.S. PATENT DOCUMENTS

| 6,599,957 B2 * | 7/2003 | Dawes | C09D 4/06 385/141 |
| 10,324,260 B1 * | 6/2019 | Evans | C08F 222/1006 |

(Continued)

OTHER PUBLICATIONS

Check et al; "Effects of Nanoparticles on Photopolymerization of Acrylate Monomers in Forming Nano-Composites"; European Polymer Journal; 70 (2015) 166172.
(Continued)

*Primary Examiner* — Michael Stahl
(74) *Attorney, Agent, or Firm* — Grant A. Gildehaus

(57) ABSTRACT

Embodiments of an optical adhesive are provided. The optical adhesive includes about 20% to about 60% by volume of first monomers. The first monomers have at least two acrylate or methacrylate groups. The optical adhesive also includes about 40% to about 80% by volume of second monomers. The second monomers have at least one fluorine atom and at least one acrylate or methacrylate group. The optical adhesive has a refractive index of from about 1.40 to about 1.55, and in the temperature range of about 10° C. to about 85° C., the refractive index of the optical adhesive has a thermal drift dn/dT of less than about $-4 \times 10^{-4}$/° C. Embodiments of a mechanical joint between two optical fiber segments using the optical adhesive and embodiments of a method for joining two optical fiber segments are also provided.

20 Claims, 3 Drawing Sheets

(51) Int. Cl.

| | |
|---|---|
| *G02B 6/38* | (2006.01) |
| *G02B 6/02* | (2006.01) |
| *C09J 135/02* | (2006.01) |
| *C09J 11/04* | (2006.01) |
| *C09J 11/06* | (2006.01) |
| *C09J 11/08* | (2006.01) |
| *G02B 6/30* | (2006.01) |
| *C09J 4/00* | (2006.01) |
| *C08F 220/22* | (2006.01) |
| *C08F 222/10* | (2006.01) |
| *C08K 3/36* | (2006.01) |
| *C08K 9/06* | (2006.01) |
| *C09J 5/00* | (2006.01) |
| *C09J 133/16* | (2006.01) |

(52) U.S. Cl.
CPC .......... *C08K 3/36* (2013.01); *C08K 9/06* (2013.01); *C09J 4/00* (2013.01); *C09J 5/00* (2013.01); *C09J 9/00* (2013.01); *C09J 11/04* (2013.01); *C09J 11/06* (2013.01); *C09J 11/08* (2013.01); *C09J 133/16* (2013.01); *C09J 135/02* (2013.01); *G02B 6/02057* (2013.01); *G02B 6/26* (2013.01); *G02B 6/305* (2013.01); *G02B 6/3801* (2013.01); *C08F 222/102* (2020.02); *C08F 222/104* (2020.02); *C08K 2201/011* (2013.01); *C09J 2205/31* (2013.01); *C09J 2433/00* (2013.01)

(56) References Cited

U.S. PATENT DOCUMENTS

2007/0284041 A1 12/2007 Iida
2018/0072924 A1 3/2018 Thompson et al.

OTHER PUBLICATIONS

Fujifilm Wako Pure Chemical Corporation; "Oil Soluble AZO Initiators"; 2 Pages; Downloaded Dec. 20, 2019.
Husar et al; "The Formulator's Guide to Anti-Oxygen Inhibition Additives"; Progress in Organic Coatings; vol. 77, (2014) pp. 1789-1798.
Dorfketal™ "Industries"; 4 Pages; Downloaded Dec. 20, 2019.
Jamieson, T.H.; "Thermal Effects in Optical Systems" ; Opt. Eng. (1981), 20(2): 156-160.
Nissan Chemical America Corporation; "Organosilicasol"; 2 Pages; (2019.
Norland Optical Adhesive 1315 "; 2 Pages; Downloaded Dec. 20, 2019".
Optiwave Photonic Software; "Optibpm Manuals"; 6 Pages; 2019.
Wikipedia; "Refractive Index"; 21 Pages; Dec. 20, 2019.

* cited by examiner

LOW DN/DT OPTICAL ADHESIVES

PRIORITY APPLICATION

This application claims the benefit of priority of U.S. Provisional Application No. 62/745,573, filed on Oct. 15, 2018, the content of which is relied upon and incorporated herein by reference in its entirety.

BACKGROUND

The disclosure relates generally to optical adhesives and more particularly to optical adhesives that exhibit low thermal drift of their refractive index. In many applications, optical fibers are terminated and spliced in the field, or otherwise coupled to other optical features. For example, an optical fiber may be terminated and connectorized to allow for simple plug-in connection to a receptacle. Connectorizing may involve splicing one optical fiber to another optical fiber. Certain types of splicing, such as fusion splicing, require expensive equipment that may be unavailable in the field or may not be useful for a particular application. Notwithstanding, a fusion splice exhibits low signal loss and does not experience temperature-related optical deficiencies. Other types of splicing using optical gels, oils, and polymers may be less expensive to perform than fusion splicing, but may exhibit uneven optical properties over a range of temperatures. Accordingly, an optical adhesive that allows for splicing with consistent optical properties over a range of temperatures and that is relatively inexpensive to perform would be desirable.

SUMMARY

In one aspect, embodiments of an optical adhesive are provided. The optical adhesive includes 20% to 60% by volume of first monomers. Each of the first monomers has at least two acrylate or methacrylate groups. The optical adhesive also includes 40% to 80% by volume of second monomers. Each of the second monomers has at least one fluorine atom and at least one acrylate or methacrylate group. The optical adhesive has a refractive index of from about 1.40 to about 1.55, and in the temperature range of about 10° C. to about 85° C., the refractive index of the optical adhesive has a thermal drift dn/dT of less than $-4\times10^{-4}$/° C.

In another aspect, embodiments of a mechanical joint, also called an optical assembly, are provided. The mechanical joint (optical assembly) includes a first optical fiber segment, a second optical fiber segment, and an optical adhesive. The first optical fiber segment has a first longitudinal axis, and the first optical fiber segment includes a first core region and a first cladding region. The first cladding region is disposed circumferentially around the first core region along the first longitudinal axis, and the first optical fiber segment has a first end face transverse to the first longitudinal axis. The second optical fiber segment has a second longitudinal axis, and the second optical fiber segment includes a second core region and a second cladding region. The second cladding region is disposed circumferentially around the second core region along the longitudinal axis, and the second optical fiber segment has a second end face transverse to the second longitudinal axis. The first optical fiber segment is arranged with respect to the second optical fiber segment such that the first longitudinal axis is coaxial with the second longitudinal axis and such that the first end face faces the second end face. The optical adhesive is bonded to the first end face and to the second end face. In some embodiments, the optical adhesive is also bonded to a least a portion of the first cladding and to at least a portion of the second cladding. The optical adhesive comprises a cured mixture of 20% to 60% by volume of first monomers and 40% to 80% by volume of second monomers. Each of the first monomers include at least two acrylate or methacrylate groups, and each of the second monomers include at least one fluorine atom and at least one acrylate or methacrylate group. A return loss across the mechanical joint is less than −40 dB as measured at a wavelength of 1310 nm.

In still another aspect, embodiments of a method of joining two optical fibers are provided. In the method, a first optical fiber is arranged coaxially to a second optical fiber such that a first end face of the first optical fiber faces a second end face of a second optical fiber. A liquid optical adhesive is between around the first optical fiber and the second optical fiber. The optical adhesive includes 20% to 60% by volume of first monomers and 40% to 80% by volume of second monomers. Each of the first monomers includes at least two acrylate or methacrylate groups, and each of the second monomers includes at least one fluorine atom and at least one acrylate or methacrylate group. Further in the method, the liquid optical adhesive is exposed to ultraviolet light, thereby causing the liquid optical adhesive to cure into a solid optical adhesive.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings, which are incorporated in and form a part of the specification, illustrate several aspects of the present disclosure and, together with the description, serve to explain the principles of the disclosure. In the drawings.

While the following embodiments will be described in connection with certain preferred embodiments, there is no intent to limit this disclosure to the described embodiments. On the contrary, the intent is to cover all alternatives, modifications, and equivalents as included within the spirit and scope of the disclosure and as defined by the appended claims.

DETAILED DESCRIPTION

Referring generally to the figures, embodiments of an optical adhesive are disclosed herein. The optical adhesive has particularly suitability for joining optical fibers in a mechanical joint, especially where other joining techniques, such as fusion splicing, are not economically or practically feasible. Advantageously, the optical adhesive exhibits low thermal drift. That is, the refractive index of the optical adhesive changes minimally with temperature. In embodiments, the change in refractive index, referred to herein as dn/dT, over the temperature range of from 10° C. to 85° C. is less than about $4 \times 10^{-4}/°$ C. In embodiments, the optical adhesive is a curable product of at least two monomers. A first monomer includes at least two acrylate or methacrylate functional groups, i.e., the first monomer is a diacrylate or a dimetacrylate. The first monomer provides stiffness to limit the thermal drift of the refractive index (low dn/dT). The second monomer is selected to match the refractive index to that of the optical fibers to be joined. In embodiments, the second monomer includes one or more fluorine-containing functional groups. Additionally, in embodiments, the optical adhesive includes silica ($SiO_2$) nanoparticles dispersed within the optical adhesive that further help to index match the optical fibers. While the optical adhesive is described in terms of its usage with optical fibers, the optical adhesive may be suitable for use in other applications and contexts, such as photonic chips, LED lighting, displays, backplanes, laminates for cell phones, lenses, and index matching to glasses for laminates, among others. Thus, the present disclosure should not to be construed as limiting.

Figure 1:
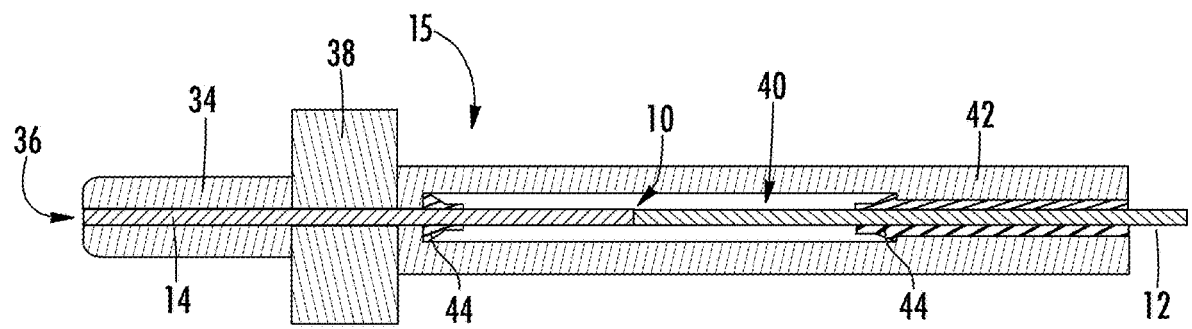
FIG. 1 is a perspective view of an optical fiber connector having a mechanical joint between an optical fiber and a fiber stub, according to an exemplary embodiment.
Figure 2:
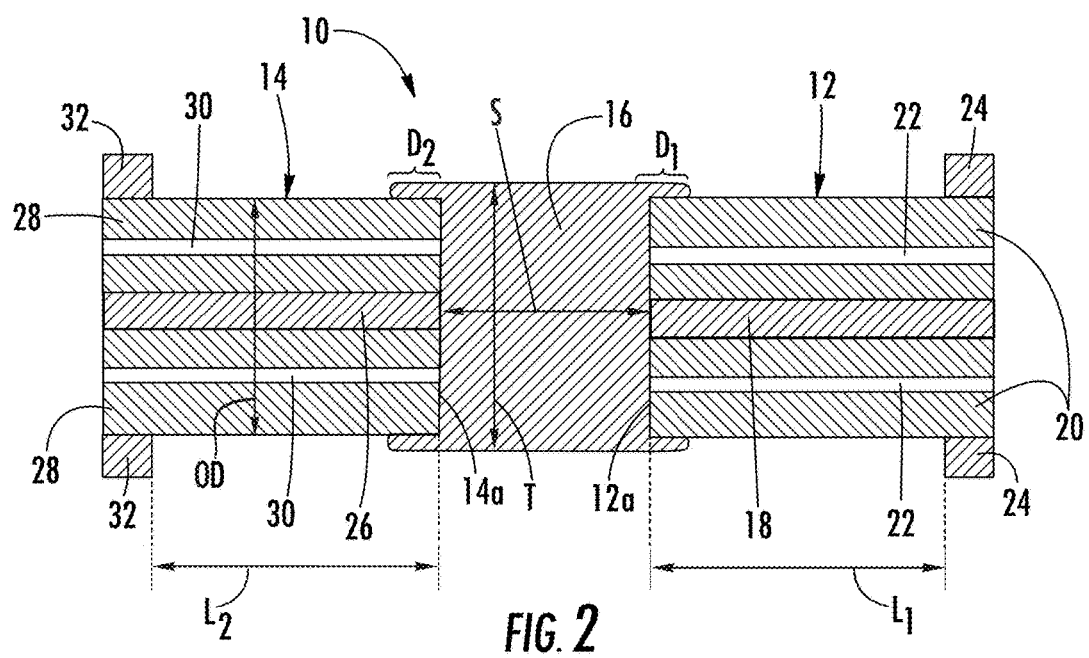
FIG. 2 depicts a detail view of a mechanical joint, according to an exemplary embodiment.

FIG. 1 depicts an embodiment in which the optical adhesive may be used, namely to form a mechanical joint 10 between two optical fibers. In particular, the mechanical joint 10 is between an optical fiber 12 and an optical fiber stub 14 of a connector 15. FIG. 2 provides a detailed view of the mechanical joint 10. As can be seen, the optical fiber 12 is joined to the fiber stub 14 using optical adhesive 16. The optical fiber 12 includes a core region 18 that is surrounded along its length by a cladding 20. The core region 18 carries optical signals transmitted from an electromagnetic radiation source. In embodiments, the optical signals include electromagnetic radiation having a wavelength from about 200 nm to about 2000 nm. The cladding 20 substantially contains the electromagnetic radiation within the core region 18 by reflecting the optical signals at the interface between the core region 18 and the cladding 20. Within the cladding 20, airlines 22 or other structures may be provided to enhance the flexibility of the optical fiber 12. The optical fiber 12 includes a fiber jacket 24 that surrounds cladding 14 along at least a portion of the length of the optical fiber 12. In embodiments, the fiber jacket 24 may be partially stripped from the cladding 20 to expose a first length $L_1$ of the core region 18 and the cladding 20 to facilitate bonding of the optical fiber 12 to the fiber stub 14.

Similarly, fiber stub 14 includes a core region 26 that is surrounded along at least a portion of its length by a cladding 28. As with the optical fiber 12, the core region 26 carries optical signals, which are kept in the core region 26 by the cladding 28. The cladding 28 may include airlines 30 or other structures to enhance the flexibility of the optical fiber 12. As with optical fiber 12, the fiber stub 14 includes a fiber jacket 32 that may be partially stripped from the cladding 14 to expose a second length $L_2$ of core region 26 and the cladding 28 to facilitate bonding of the fiber stub 14 to the optical fiber 12.

The optical fiber 12 has an end face 12a that is aligned with an end face 14a of the fiber stub 14. The end faces 12a, 14a are substantially coaxial and are separated by a space S. While the space S is depicted as being a constant space between the fibers, the space S between the end faces 12a, 14a may vary, including being zero (i.e., the end faces 12a, 14a touch in regions), depending, e.g., on the geometry of the end faces 12a, 14a after cleaving. In embodiments, the space S between end faces 12a, 14a is no more than about 900 nm. The optical adhesive 16 (FIG. 2) fills the space S between the end face 12a of the optical fiber 12 and the end face 14a of the fiber stub 14. Further, the optical adhesive 16 may extend over a portion of the exposed region $L_1$ of the optical fiber 12 for a first distance $D_1$ and over the exposed region $L_2$ of the fiber stub 14 for a second distance $D_2$. In some embodiments, the distances $D_1$ and $D_2$ are the same, and in other embodiments the distances $D_1$ and $D_2$ are different with $D_1$ being greater than $D_2$ or with $D_2$ being greater than $D_1$. In some embodiments, the distances $D_1$ and $D_2$ are from about 500 μm to about 1500 μm. Further, in some embodiments the optical fiber 12 and the fiber stub 14 each have an outer cladding diameter OD of from about 10 μm to about 800 μm. In some embodiments, the optical adhesive 16 has a thickness T that is greater than the outer cladding diameter OD. In further embodiments, the thickness T of the optical adhesive 16 is at least 1.01*OD, and in some embodiments, the thickness T of the optical adhesive 16 is up to 1.50*OD. In embodiments in which the OD of the optical fiber 12 is different than the OD of the fiber stub 14, the optical adhesive has a thickness of from about 1.01 to about 1.50 times the larger of the OD of the optical fiber 12 (also called a first outer diameter) and the OD of the fiber stub 14 (also called the second outer diameter).

Returning to FIG. 1, it can be seen that the mechanical joint 10 is contained within a connector 15. The connector 15 may include a ferrule 34 into which the fiber stub 14 is inserted. The ferrule 34 has a polished end 36 designed to form an optical connection with a receptacle (not pictured). In embodiments, the connector 15 is provided with a flange 38 downstream of the polished end 36, which may provide an abutment structure used in making an optical connection with a receptacle. In certain applications, a connector 15 may be provided with a fiber stub 14 and pre-polished in the factory after fabrication. In such an instance, the fiber stub 14 is connected with an optical fiber 12 in the field. In some applications, the connection between the fiber stub 14 and the optical fiber 12 is a fusion splice in which the ends of the fiber stub 14 and optical fiber 12 are fused together using heat. However, while fusion splices typically provide the best quality joint in terms of signal loss, fusion splicing equipment is expensive and may, in some circumstances, be difficult to use or unavailable in the field. According to the present disclosure, the optical adhesive 16 may be used to join the optical fiber 12 and fiber stub 14 in a manner that is more economical and easier to perform in the field. Further, as compared to other mechanical joining methods, the optical adhesive as disclosed herein exhibits lower signal loss across the joint as well as less thermal drift of the refractive index.

When joining the optical fiber 12 and fiber stub 14, the ends of each are inserted into a channel 40 of a connector body 42. The connector body 42 includes alignment features 44 that help bring the ends of the optical fiber 12 and the fiber stub 14 into coaxial alignment. The optical adhesive 16 is introduced into the channel 40 in liquid form and cured to a solid mechanical joint 10 using, for example, one or more of thermal energy, ultraviolet light, or pressure. In some embodiments, the formation of the mechanical joint 10 is facilitated with a double-ended optical fiber ferrule having a slit formed therein. The optical fiber 12 and fiber stub 14 are inserted into the double-ended ferrule, and the optical adhesive 16 is deposited around the optical fibers 12, 14 and between the end faces 12a, 14a through the slit. Thereafter, ultraviolet light is shone through the slit to cure the optical adhesive 16.

As noted above, the foregoing description is illustrative of a use of the optical adhesive 16 and other uses are within the scope of this description. Having described an exemplary context for use of the optical adhesive 16, the composition and properties of the optical adhesive will now be described. Because the optical adhesive 16 may be used to join optical fibers 12, 14, the optical adhesive must allow for the transfer of optical signal across the mechanical joint 10 without significant signal loss. In this regard, embodiments of the optical adhesive 16 are made to have a refractive index that is within +/−5% of the refractive indexes of the optical fibers 12, 14 at a wavelength of 1310 nm when measured at 25° C. In other embodiments, the optical adhesive has a refractive index within +/−3% of the refractive indexes of the optical fibers 12, 14 when measured at 25° C., and in still other embodiments, the optical adhesive 16 is made to have a refractive index within +/−2% of the refractive indexes of the optical fibers 12, 14 when measured at 25° C.

In some embodiments, the optical fibers 12, 14 have a first refractive index, the first monomers have a second refractive index that is higher than the first refractive index, and the second monomers have a third refractive index that is lower than the first refractive index. Thus, when combined, the liquid optical adhesive has a fourth refractive index that is less than the first refractive index. After exposing the liquid optical adhesive to ultraviolet light, thereby causing the liquid optical adhesive to cure into a solid optical adhesive, the solid optical adhesive has a fifth refractive index that is within 5% of the first refractive index. In some embodiments, during the exposing step, the fourth refractive index rises from about 0.01 to about 0.05 to the fifth refractive index.

Further, the optical adhesive 16 is made to have low thermal drift of its refractive index at typical usage temperatures, e.g., between the temperatures of about 10° C. to about 85° C. Changes in temperature cause most materials to expand (when heated) or contract (when cooled). As a material expands or contracts, its volume generally increases or decreases, respectively, and the density of a material is inversely proportional to the volume of the material (density=mass/volume). Typically, a denser material has a higher refractive index than a less dense material. Thus, as a material is heated, the increase in volume and accompanying decrease in density will typically result in a decrease in the refractive index of the material. Similarly, when a material is cooled, the decrease in volume and accompanying increase in density will typically result in an increase in the refractive index of the material. Further, because the optical fibers 12, 14 are a different material than the adhesive 16 used to join them, the refractive indexes may not change at the same rate when heated or cooled. Thus, as mentioned above, the change in refractive index with temperature can have a negative impact in optical communication where two fibers 12, 14 are joined with a material that does not match the thermal drift of the two fibers 12, 14. Accordingly, as temperatures deviate from standard (e.g., 25° C.) where the materials are typically index matched, the optical transmission properties of certain conventional materials used to form mechanical joints are negatively impacted. Indeed, in some instances, the conventional mechanical joint materials experienced a change in return loss of more than 10 dB, and in some instances more than 20 dB, in the range of 10° C. to 85° C. That is, much more of the transmitted optical signal is reflected as the temperature deviates farther and farther from standard temperature.

According to the present disclosure, though, the optical adhesive 16 does not experience the same large changes in return loss as conventional materials at least in part because the optical adhesive 16 has low thermal drift of the refractive index (i.e., low dn/dT). The composition of the optical adhesive 16 that allows for these properties includes at least one first monomer having two acrylate or methacrylate functional groups and at least one second monomer having at least one fluorine atom and at least one acrylate or methacrylate group. In embodiments, the optical adhesive 16 includes from about 20% to about 60% by volume of the first monomers and from about 40% to about 80% by volume of the second monomers. Additionally, in embodiments, the optical adhesive 16 includes from about 1% to about 30% by weight of a nanoparticle, such as silica. Further, in embodiments, the nanoparticle is a polymerizabale nanoparticle. Further, in embodiments, the optical adhesive 16 includes from about 0.5% to about 5% by volume of a silane acrylate or methacrylate. As will be discussed more fully below, in the optical adhesive 16, the first monomers provide stiffening of the optical adhesive to mitigate the thermal drift in refractive index while the second monomers allow for tuning of the refractive index to wavelengths low enough to be matching for optical fibers 12, 14.

In greater detail, the first monomers include at least two acrylate or methacarylate groups and thus may be referred to as a diacrylate or dimethacrylate. In embodiments, the first monomer may contain more than two acrylate or methacrylate groups, such as a triacrylate. Such first monomers will extensively crosslink during polymerization, which will then yield a structure that resists thermal expansion. In embodiments, the first monomers may also contain one or more fluorine atoms to provide further tunability of the refractive index. Exemplary first monomers include 1,4-butanediol diacrylate, 1,4-butanediol dimethacrylate, 1,3-butanediol diacrylate, 2,2,3,3-tetrafluoro-1,4-butanediol diacrylate, and 2,2,3,3-tetrafluoro-1,4-butanediol dimethacrylate. The second monomers include at least one fluorine atom and at least one acrylate or methacrylate group and thus may be referred to as a monoacrylate or monomethacrylate. In embodiments, each second monomer contains from 1 fluorine atom to 23 fluorine atoms. Exemplary second monomers include 1,1,1,3,3,3-hexafluoroisopropyl methacrylate, 2,2,2-trifluoroethyl methacrylate, 2,2,3,3,4,4,5,5-octafluoropentyl methacrylate, and 2,2,3,3-tetrafluoropropyl methacrylate.

Table 1 provides an exemplary list of first monomers and second monomers along with their refractive indexes as measured at 25° C. As can be seen from Table 1, the first monomers all have higher refractive indexes than the second monomers. As such, the combination of first and second monomers will have a refractive index between the bounds of the refractive indexes of the first and second monomers. The monomers provided in Table 1 are provided for illustrative purposes only. Other monomers having the characteristics described above may also be used for the first monomers or second monomers depending on the final refractive index desired.

TABLE 1

List of First and Second Monomers for Optical Adhesive

| | Refractive index at 25° C. |
|---|---|
| FIRST MONOMERS | |
| 1,4-butanediol diacrylate | 1.45465 |
| 1,4-butanediol dimethacrylate | 1.45576 |
| 1,3-butanediol diacrylate | 1.44910 |
| 2,2,3,3-tetrafluoro-1,4-butanediol diacrylate | 1.41754 |
| 2,2,3,3-tetrafluoro-1,4-butanediol dimethacrylate | 1.41835 |
| SECOND MONOMERS | |
| 1,1,1,3,3,3-hexafluoroisopropyl methacrylate | 1.32892 |
| 2,2,2-trifluoroethyl methacrylate | 1.35932 |
| 2,2,3,3,4,4,5,5-octafluoropentyl methacrylate | 1.35569 |
| 2,2,3,3-tetrafluoropropyl methacrylate | 1.37229 |

In the context of optical fibers, in embodiments, the optical adhesive 16 includes first and second monomers in a proportion that achieves a final refractive index of from about 1.36 to about 1.50 as measured with a wavelength of 1550 mm at 25° C. In a particular embodiment, the optical adhesive 16 is selected to have a refractive index of about 1.43 as measured with a wavelength of 1550 nm at 25° C.

As mentioned above, in embodiments, the optical adhesive may also include nanoparticles. In particular embodiments, the nanoparticles are polymerizable. Polymerizable nanoparticles are nanoparticles coated with functional groups, such as acrylate, methacrylate, or vinyl groups. In embodiments, the nanoparticles are sized such that, on average, a longest cross-sectional dimension of such nanoparticles is from about 5 nm to about 50 nm, from about 5 nm to about 45 nm, from about 5 nm to about 40 nm, from about 5 nm to about 35 nm, from about 5 nm to about 30 nm, from about 5 nm to about 25 nm, from about 5 nm to about 20 nm, from about 5 nm to about 15 nm, or from about 5 nm to about 10 nm. In embodiments, the nanoparticles comprise a material having a refractive index matching or less than the refractive index of the material of the core region 18, 26 (as shown in FIG. 2). In an embodiment, an exemplary nanoparticle material is silica. A particularly suitable polymerizable silica nanoparticular for use in the optical adhesive is acrylate coated nanosilica particles available from Nissan Chemical Corporation (commercially known as ORGANO-SILICASOL™, in particular product designation MEK-AC-2202). In a particular embodiment, the nanoparticles are silica nanoparticles and have an average cross-sectional dimension of 20 nm. Advantageously, such silica nanoparticles enhance rigidity of the cured optical adhesive without inducing scattering effects for the long telecom wavelengths of 1310 nm and 1550 nm.

In embodiments, the optical adhesive includes an adhesion promoter. Exemplary adhesion promoters include organic titanates and zironates (e.g., Tyzor® available from Dorf-Ketal Chemicals India Private Limited, Maharashtra, India) and 3-(trimethoxysilyl)propyl methacrylate. In embodiments, the adhesion promoter or promoters are applied to the bonding regions of the optical fibers to be joined prior to applying the optical adhesive.

In embodiments, the optical adhesive includes anti-oxygen inhibition additives. Such anti-oxygen inhibition additives inhibit oxygen from limiting the UV curing of the polymer during atmospheric polymerization. Exemplary anti-oxygen inhibition additives usable in the optical adhesive 16 are broadly classified as hydrogen donors (e.g., amines, thiols, hydrogen phosphites, silanes, stannanes, benzaldehydes, etc.), N-vinyl amides reducing agents (e.g., aromatic phosphines, aliphatic phosphines, phosphites, sulphites, etc.), sensitizers (e.g., isopropyl thioxanthone), $CO_2$ producers (e.g., N-phenylglycine and its derivatives, phenylthioacetic acid, O-benzoyloxime benzaldehyde, 1-phenyl-1,2-propanedione2-(O-ethoxycarboxy)oxime), and $O_2$ scavengers (e.g., trieithyl amine, (2,4,6-trimethylbenzoyl) diphenylphosphine oxide ["TPO"], 2, 5-diphenyl furan, 9,10-dibutyl anthracene, etc.). In particular, triphenyl phosphine ($PPh_3$), an N-vinyl amide reducing agent, is believed to be a potent additive for mitigation of oxygen inhibition of polymerization. Advantageously, the anti-oxygen inhibition additives are effective at improving the curing efficiency for low energy LED light curing systems, which may be suitable for field curing of the optical adhesive 16 disclosed herein.

In order to cure the optical adhesive 16, a photonitiator is included. In embodiments, the optical adhesive 16 includes from about 0.5% to about 5% by volume of a photoinitator. Suitable photoinitators include bis(2,4,6-trimethylbenzoyl)-phenylphosphineoxide (e.g., IRGACURE® 819, available from Ciba Specialty Chemicals, Inc.), 2-Hydroxy-2-methyl-1-phenyl-propan-1-one (e.g., DAROCUR® 1173, avialavle from Ciba Specialty Chemicals, Inc.), and benzophenone, among others. Such photoinitators cure when subject to ultraviolet light having a wavelength of from about 300 nm to about 500 nm.

In formulating the optical adhesive 16, it is noted that the refractive index will increase from the liquid form to the solid form after curing. Accordingly, the first and second monomers are selected and proportioned with this in mind. In preparing a formulation for the optical adhesive 16, the liquid refractive index will be between the refractive indexes of the first monomer and the second monomer. Further, other additives, such as the photoinitators, nanoparticles, adhesion promotors, and anti-oxygen inhibition additives, will affect the refractive index of the liquid optical adhesive. Additionally, upon curing, the solid optical adhesive will have a refractive index of from about 0.01 to about 0.05 higher than the liquid refractive index on account of the crosslinking that occurs during curing. More typically, the solid optical adhesive 16 will have a refractive index of from about 0.03 to about 0.04 higher than the liquid refractive index. Table 2, below, provides the refractive index of various mixtures prior to curing. For the purpose of comparison, the final entry in the table for 100% 1,1,3,3,3-hexafluoroisopropyl methacrylate demonstrates that curing of a single component also causes an increase in refractive index from liquid to solid. The first entry of 1,4-butanediol dimethacrylate and 1,1,3,3,3-hexafluoroisoprpyl methacrylate cured to a final refractive index of 1.4492, which was about 0.033 higher than the liquid refractive index.

TABLE 2

Refractive indices (n) for monomer mixtures

| Diacrylate or dimethacrylate monomer (A) | Fluorine-containing monomer (B) | A:B | n at 25° C. (before cure) |
|---|---|---|---|
| 1,4-butanediol dimethacrylate | 1,1,3,3,3-hexafluoroisoprpyl methacrylate | 1:1 | 1.41163 |
| 1,4-butanediol dimethacrylate | 2,2,3,3,-tetrafluoro-1,4-butanediol diacrylate | 1:1 | 1.45031 |

TABLE 2-continued

Refractive indices (n) for monomer mixtures

| Diacrylate or dimethacrylate monomer (A) | Fluorine-containing monomer (B) | A:B | n at 25° C. (before cure) |
|---|---|---|---|
| 1,4-butanediol dimethacrylate | 2,2,3,3-tetrafluoro-1,4-butanediol dimethacrylate | 1:1 | 1.45009 |
| Comparative Example | | | |
| 100% 1,1,3,3,3-hexafluoroisopropyl methacrylate | | | 1.31816 |

Figure 3:
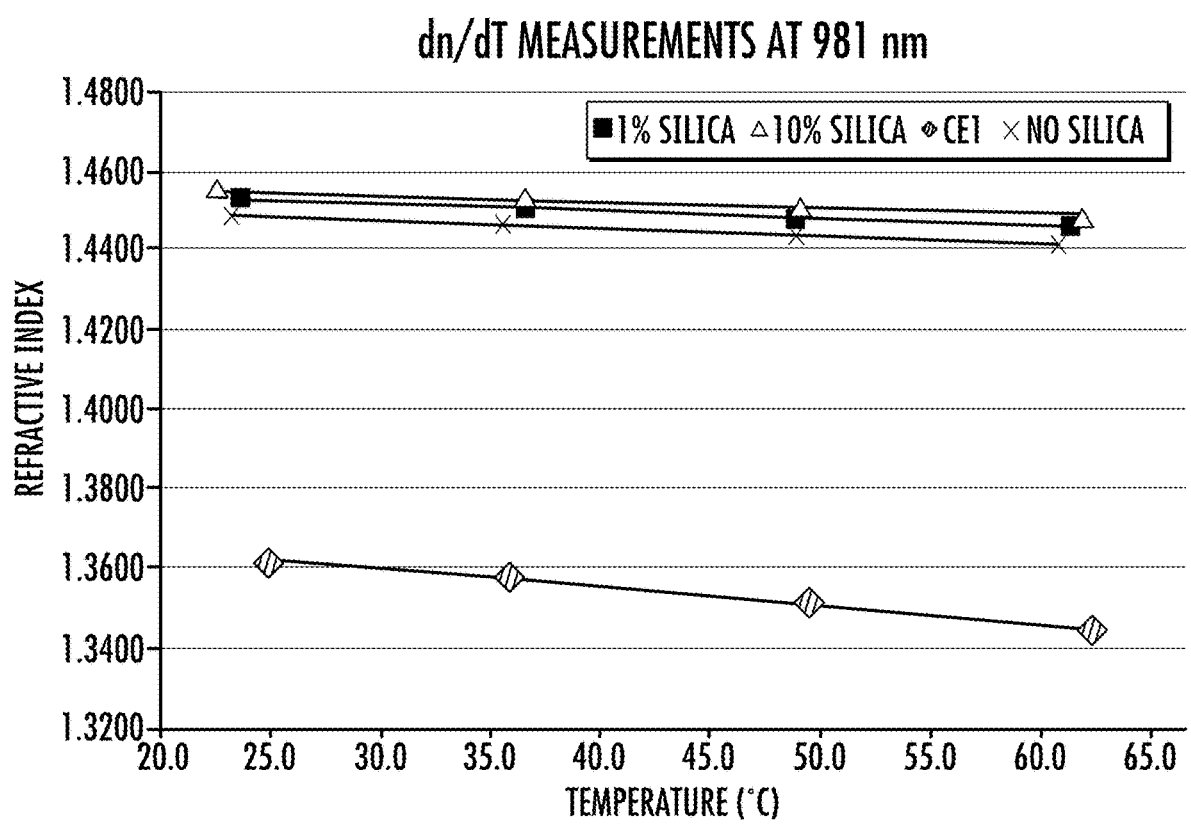
FIG. 3 depicts dn/dT measurements for three optical adhesives according to the present disclosure and one comparative example.

Table 3, below, provides exemplary compositions for the optical adhesive 16 as well as a comparative example. The three exemplary compositions comprise the first monomer of 1,4-butanediacrylate and the second monomer of 1,1,3,3,3-hexafluoroisopropyl methacrylate in a ratio of 1:1 by volume. To each of the exemplary compositions, a different amount of silica nanoparticles ("nanosilica") was added. Example 1 has no nanosilica; Example 2 has 1% by weight nanosilica; and Example 3 has 10% by weight nanosilica. The Comparative Example contains only 1,1,3,3,3-hexafluoroisopropyl methacrylate. In Table 3, each composition has a reported refractive index measured at 5° C. As can be seen, increasing the amount of nanosilica increases the refractive index. Further, each example has a thermal drift provided. The thermal draft was calculated by taking the slope of the lines plotted in FIG. 3. As can be seen in FIG. 3, the lines for Examples 1-3 are much less steep than the line for Comparative Example 1. FIG. 3 and Table 3 also demonstrate that the thermal draft decreasing with increasing amounts of nanosilica. All refractive index measurements shown in FIG. 3 were determined on a Metricon 2010 Prism Coupler using the single beam method according to ASTM C1648-12. High temperature measurements were made by heating the sample compartment with $N_2$ purge run through a copper coil immersed in a silicone oil bath heated by a temperature controlled circulator unit. Measurements of dn/dT were performed at 633 nm and 981 nm. The measures at 981 nm are shown in FIG. 3.

TABLE 3

Effect of Nanosilica on Refractive Index and Thermal Drift

| Optical adhesive | n at 5° C. | dn/dT |
|---|---|---|
| Comparative Example 1 | 1.3620 | $-4.51 \times 10^{-4}/°$ C. |
| Example 1 (no nanosilica) | 1.4492 | $-1.80 \times 10^{-4}/°$ C. |
| Example 2 (1% nanosilica) | 1.4603 | $-1.68 \times 10^{-4}/°$ C. |
| Example 3 (10% nanosilica) | 1.4551 | $-1.42 \times 10^{-4}/°$ C. |

With continued reference to Table 3 and FIG. 3, comparison of thermal profiles for the two monomer system of Examples 1-3 with the single monomer of Comparative Example 1 demonstrates improved dn/dT for the optical adhesive. Comparative Example 1, 1,1,3,3,3-hexafluoroisopropyl methacrylate has been used as a low refractive index optical adhesive. The slope of Comparative Example 1 between 25° C. and 62.3° C. is $-4.51 \times 10^{-1}/°$ C. When this monomer is combined at 50% by volume with 1,4-butanediacrylate (Example 1), the refractive index increases to about 1.449, and dn/dT also increases to $-1.80 \times 10^{-4}/°$ C. Taking the same 50%/50% mixture and adding 1% by weight of acrylate coated nanosilica (Example 2) provides a further increase in dn/dT of $-1.68 \times 10^{-4}/°$ C. When the acrylate-coated nanosilica is increased to 10% by weight, then dn/dT increases further to $-1.42 \times 10^{-3}/°$ C. Table 4, below, provides exact compositions for Examples 1-3. Darocur 1173 and benzophenone are used as photoinitators.

TABLE 4

Example Optical Adhesive Compositions

| | Example 1 | Example 2 | Example 3 |
|---|---|---|---|
| 1,1,3,3,3-hexafluoroisopropyl methacrylate | 1 ml | 1 ml | 1 ml |
| 1,4-butanediol diacrylate | 1 ml | 1 ml | 1 ml |
| 3-(trimethoxysilyl) propyl methacrylate | 68 μL | 68 μL | 68 μL |
| Nanosilica-acrylate | 0 | 22 mgs | 220 mgs |
| Darocur 1173 | 50 μL | 50 μL | 50 μL |
| Benzophenone | 150 mgs | 150 mgs | 150 mgs |

Figure 4:
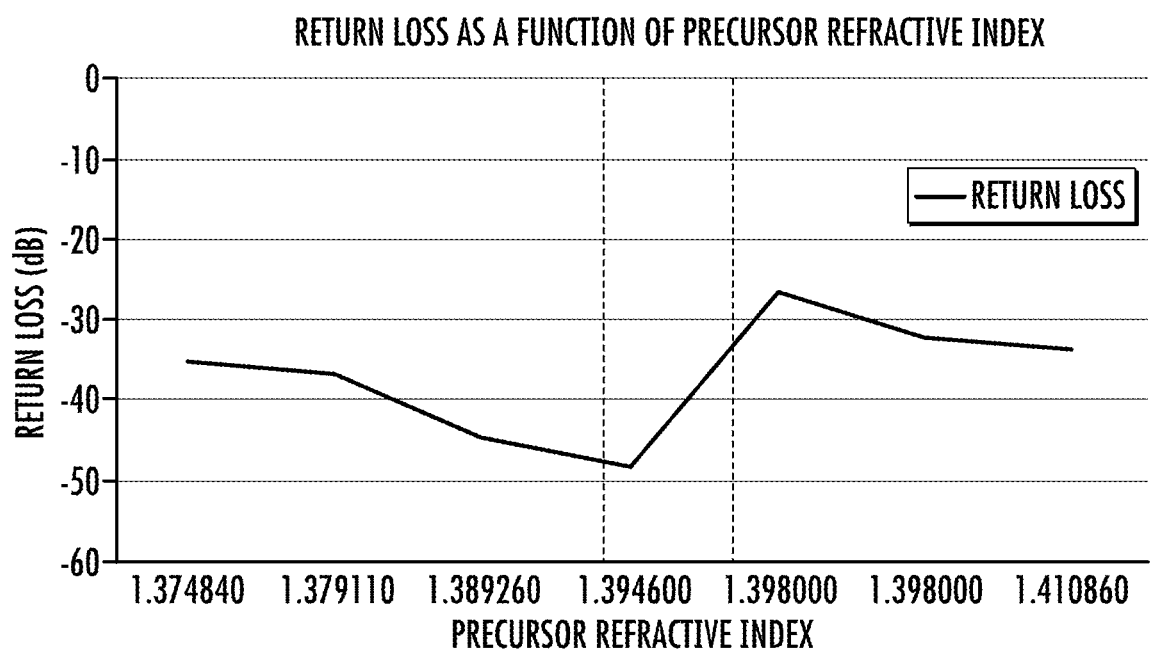
FIG. 4 depicts the return loss as a function of precursor refractive index for optical adhesives according to the present disclosure, according to an exemplary embodiment.

FIG. 4 depicts return loss against the liquid optical adhesive refractive index (i.e., before UV light cure). The return loss is measured for SMF-28 optical fiber (available from Corning Incorporated, Corning, N.Y.). As can be seen, the return loss for an optical adhesive 16 according to present disclosure is less than −40 dB. In embodiments, the return loss is less than −45 dB. From FIG. 4, it is estimated that the optimal precursor refractive index value before UV cure lies somewhere between about 1.39460 and about 1.39800. It should be noted that the refractive indexes given in FIG. 4 were measured at typical telecommunications wavelengths of 1310 nm to 1550 nm, and the refractive indexes of the materials used in the optical adhesive 16 were lower at these wavelengths than the refractive indexes reported in the other Tables and Figures, which were measured at 981 nm. Hence, the "optimal" precursor refractive index is for telecommunications applications, and the optimal precursor refractive index for other applications and/or as measured at a different wavelength may be different. The refractive index of the precursor optical adhesive liquid were measured before UV light polymerization on an ABBE Refractometer (Anton Paar, Abbemat 300 with temperature control accuracy ±0.0001 nD).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical adhesive, comprising:
   20% to 60% by volume of first monomers, each of the first monomers comprising at least two acrylate or methacrylate groups; and
   40% to 80% by volume of second monomers, each of the second monomers comprising at least one fluorine atom and at least one acrylate or methacrylate group;

wherein, upon curing, the cured optical adhesive has a refractive index of from about 1.40 to about 1.55; and wherein, in the temperature range of about 10° C. to about 85° C., the refractive index of the cured optical adhesive has a thermal drift dn/dT of less than the absolute magnitude of $|4\times10^{-4}/°C.|$ and the sign of that value is negative.

2. The optical adhesive of claim 1, further comprising about 1% to about 30% by weight of nanoparticles, the nanoparticles having, on average, a longest cross-sectional dimension of from about 5 nm to about 50 nm.

3. The optical adhesive of claim 2, wherein the nanoparticles are coated with at least one functional group.

4. The optical adhesive of claim 2, wherein the nanoparticles comprise silica.

5. The optical adhesive of claim 1, wherein:
the first monomers comprise at least one of 1,4-butanediol diacrylate, 1,4-butanediol dimethacrylate, 1,3-butanediol diacrylate, 2,2,3,3-tetrafluoro-1,4-butanediol diacrylate, or 2,2,3,3-tetrafluoro-1,4-butanediol dimethacrylate; and
the second monomers comprise at least one of 1,1,1,3,3,3-hexafluoroisopropyl methacrylate, 2,2,2-trifluoroethyl methacrylate, 2,2,3,3,4,4,5,5-octafluoropentyl methacrylate, or 2,2,3,3-tetrafluoropropyl methacrylate.

6. The optical adhesive of claim 1, further comprising at least one of an adhesion promoter or an anti-oxygen inhibition additive.

7. The optical adhesive of claim 1, wherein at least a portion of the first monomers comprise at least one fluorine atom.

8. A mechanical joint, comprising:
a first optical fiber segment having a first longitudinal axis, wherein the first optical fiber segment comprises a first core region and a first cladding region, and wherein the first optical fiber segment has a first end face transverse to the first longitudinal axis;
a second optical fiber segment having a second longitudinal axis, wherein the second optical fiber segment comprises a second core region and a second cladding region, wherein the second optical fiber segment has a second end face transverse to the second longitudinal axis, and wherein the first optical fiber segment is arranged with the second optical fiber segment such that the first longitudinal axis is coaxial with the second longitudinal axis and such that the first end face faces the second end face;
an optical adhesive bonded to the first end face and to the second end face, wherein the optical adhesive comprises a cured mixture of:
20% to 60% by volume of first monomers, each of the first monomers comprising at least two acrylate or methacrylate groups; and
40% to 80% by volume of second monomers, each of the second monomers comprising at least one fluorine atom and at least one acrylate or methacrylate group; and
wherein a return loss across the mechanical joint is less than −40 dB as measured at a wavelength of 1310 nm.

9. The mechanical joint of claim 8, wherein the optical adhesive is also bonded to a least a portion of an outer surface of the first cladding region and to at least a portion of an outer surface the second cladding region.

10. The mechanical joint of claim 8, wherein the first cladding region defines a first outer diameter of the first optical fiber segment, the second cladding region defines a second outer diameter of the second optical fiber segment, and wherein the optical adhesive has a thickness of from about 1.01 to about 1.50 times the larger of the first outer diameter and the second outer diameter.

11. The mechanical joint of claim 8, wherein the optical adhesive fills a space between the first end face and the second end face, and wherein the space is less than 900 nm.

12. The mechanical joint of claim 8, wherein the first optical fiber segment and the second optical fiber segment each have a first refractive index, the optical adhesive has a second refractive index, and wherein the second refractive index is within about +/−5% of the first refractive index as measured at a wavelength of 1310 nm and at 25° C.

13. The mechanical joint of claim 8, wherein the optical adhesive further comprises about 1% to about 30% by weight of nanoparticles, the nanoparticles having, on average, a longest cross-sectional dimension of from about 5 nm to about 50 nm.

14. The mechanical joint of claim 8, wherein the optical adhesive further comprises at least one of an adhesion promoter or an anti-oxygen inhibition additive.

15. A method of joining two optical fibers, the method comprising the steps of:
arranging a first optical fiber coaxially to a second optical fiber such that a first end face of the first optical fiber faces a second end face of a second optical fiber;
providing a liquid optical adhesive between the first optical fiber and the second optical fiber, wherein the optical adhesive comprises about 20% to about 60% by volume of first monomers and about 40% to about 80% by volume of second monomers, each of the first monomers comprising at least two acrylate or methacrylate groups, and each of the second monomers comprising at least one fluorine atom and at least one acrylate or methacrylate group;
exposing the liquid optical adhesive to ultraviolet light, thereby causing the liquid optical adhesive to cure into a solid optical adhesive.

16. The method of claim 15, wherein the first optical fiber and the second optical fiber each have a first refractive index, wherein the first monomers have a second refractive index that is higher than the first refractive index, wherein the second monomers have a third refractive index that is lower than the first refractive index, and wherein the method further comprises the steps:
combining the first monomers with the second monomers to form the liquid optical adhesive with a fourth refractive index that is less than the first refractive index; and
wherein, after the exposing step, the solid optical adhesive has a fifth refractive index that is within 5% of the first refractive index.

17. The method of claim 16, wherein, during the exposing step, the fourth refractive index rises from about 0.01 to about 0.05 to the fifth refractive index.

18. The method of claim 15, wherein the liquid optical adhesive further comprises from about 1% to about 30% by weight of nanoparticles, the nanoparticles having, on average, a longest cross-sectional dimension of from about 5 nm to about 50 nm.

19. The method of claim 15, wherein:
the first monomers comprise at least one of 1,4-butanediol diacrylate, 1,4-butanediol dimethacrylate, 1,3-butanediol diacrylate, 2,2,3,3-tetrafluoro-1,4-butanediol diacrylate, or 2,2,3,3-tetrafluoro-1,4-butanediol dimethacrylate; and
the second monomers comprise at least one of 1,1,1,3,3,3-hexafluoroisopropyl methacrylate, 2,2,2-trifluoroethyl methacrylate, 2,2,3,3,4,4,5,5-octafluoropentyl methacrylate, or 2,2,3,3-tetrafluoropropyl methacrylate.

20. The method of claim 16, wherein, in the temperature range of about 10° C. to about 85° C., a refractive index of the solid optical adhesive has a thermal drift dn/dT of less than the absolute magnitude of |4×10$^{-4}$/° C.| and the sign of that value is negative.

* * * * *

UNITED STATES PATENT AND TRADEMARK OFFICE
CERTIFICATE OF CORRECTION

PATENT NO. : 10,816,732 B2
APPLICATION NO. : 16/599213
DATED : October 27, 2020
INVENTOR(S) : Shawn Michael O'Malley Page 1 of 1

It is certified that error appears in the above-identified patent and that said Letters Patent is hereby corrected as shown below:

In the Claims

In Column 11, Line 67, Claim 10, after "segment," insert -- wherein --.

In Column 12, Line 10, Claim 12, after "index," insert -- wherein --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*